United States Patent [19]
Cho et al.

[11] Patent Number: 5,729,355
[45] Date of Patent: Mar. 17, 1998

[54] FACSIMILE MACHINE HAVING A PHASE/ AMPLITUDE FLUCTUATION DETECTOR

[75] Inventors: Naoki Cho, Kasuga; Tokio Imahayashi, Fukuoka; Kenichi Uemura, Nakagawa-machi, all of Japan

[73] Assignee: Matsushita Electric Industrial Co. Ltd., Osaka, Japan

[21] Appl. No.: 381,092

[22] Filed: Jan. 30, 1995

[30] Foreign Application Priority Data

Jan. 28, 1994 [JP] Japan ................. 6-008273

[51] Int. Cl.$^6$ ............................................. H04N 1/36
[52] U.S. Cl. ..................... 358/412; 358/406; 375/226; 370/229
[58] Field of Search ........................... 358/434, 435, 358/436, 437, 438, 439, 406, 412; 375/225, 226, 220, 222; 370/229, 215; H04N 1/36

[56] References Cited

U.S. PATENT DOCUMENTS

| | | | |
|---|---|---|---|
| 3,845,390 | 10/1974 | De Jager et al. | 375/231 |
| 3,889,057 | 6/1975 | Perreault | 358/412 |
| 4,153,916 | 5/1979 | Miwa et al. | 358/257 |
| 4,274,114 | 6/1981 | Kozma | 358/412 |
| 4,943,973 | 7/1990 | Werner | 375/1 |
| 5,127,027 | 6/1992 | Takahashi | 375/111 |
| 5,175,746 | 12/1992 | Inoue et al. | 375/13 |
| 5,351,134 | 9/1994 | Yaguchi et al. | 358/412 |

FOREIGN PATENT DOCUMENTS

| | | | |
|---|---|---|---|
| 52-13714 | 2/1977 | Japan | 358/412 |
| 0056318 | 5/1979 | Japan | H04N 1/36 |
| 0086579 | 7/1981 | Japan | H04N 1/36 |
| 0089168 | 7/1981 | Japan | H04N 1/00 |
| 0045775 | 3/1982 | Japan | H04N 1/32 |
| 60-10974 | 1/1985 | Japan | 358/412 |
| 62-269563 | 11/1987 | Japan . | |
| 5-64907 | 9/1993 | Japan . | |

*Primary Examiner*—Edward L. Coles, Sr.
*Assistant Examiner*—Madeleine A.V. Nguyen
*Attorney, Agent, or Firm*—Ratner & Prestia

[57] ABSTRACT

A facsimile machine includes a phase/amplitude fluctuation detector for quantitatively detecting fluctuation of the phase and amplitude of data received at a modem and a reception speed determiner for determining if the reception is to be continued or not and at which communication speed the data is to be received if reception is to continue, based on the fluctuation values detected at the phase/amplitude fluctuation detection means. The facsimile machine quantitatively detects the fluctuation values of the phase and the amplitude of the signal being received. When the fluctuation values exceed a designated range, even if the bit-pattern of the received data is normal, the facsimile machine starts receiving video information via a one-step reduced communication speed and therefore can accurately receive the video information even if the telephone circuit condition is not good.

10 Claims, 7 Drawing Sheets

Facsimile At Own Side

FACSIMILE MACHINE HAVING A PHASE/AMPLITUDE FLUCTUATION DETECTOR

BACKGROUND OF THE INVENTION (1) Field of the Invention

The present invention relates to a facsimile machine being connected to a communication circuit and having T30 protocol.

(2) Description of the Prior Art

When a communication speed is determined at a facsimile machine, a preferred method has been one based on whether the bit-pattern of the received training TCF (Training Check Facilities) signal is "0" or not. A common configuration of this type is shown in FIG. 1.

In FIG. 1, when a facsimile machine receives a call, an NSF (Non-Standard Facilities)/DIS (Digital Identification Signal) signal is produced at a T30 protocol controller 16 and the signal is written in a communication control memory 15. The signal is read at a transmission data controller 14 and then is written and modulated at a modem 12. Thus, the NSF/DIS signal is transmitted to another facsimile machine at a remote site (call-out site).

T30 protocol is used in G3 facsimile and is described in Protocol T series issued from ITU (International Telecommunication Union).

A DCS (Digital Command Signal) signal transmitted from the facsimile machine at the remote site is demodulated at modem 12. The demodulated data is written in communication control memory 15 through a reception data controller 13 and the DCS signal is analyzed at T30 protocol controller 16.

T30 protocol controller 16 reads communication speed information included in the DCS signal. Controller 16 then determines a communication speed for modem 12 to receive a training TCF signal transmitted from the facsimile machine at the remote site according to the contents of the DCS signal.

The training TCF signal transmitted from the facsimile machine at the remote site is then demodulated at modem 12, and is written in communication control memory 15 through reception data controller 13. A bit pattern of the TCF data extracted from the TCF signal is analyzed at T30 protocol controller 16. If the analyzed result of the recognized bit-pattern is "00", it is judged that the TCF reception is normal and a CFR (Confirmation to Receive) signal is transmitted to the facsimile machine at the remote site and the facsimile machine at the local site starts receiving video information.

In the above-explained configuration, however, even if the electrical characteristic of the telephone circuit deteriorates during TCF reception and the phase and amplitude of the signal fluctuate widely, because only the bit-pattern of the TCF data is checked, if the TCF data for 1.5 seconds happens to be "0", it is judged to be able to communicate at the present communication speed. The CFR signal is thus transmitted and the facsimile machine starts receiving video information. Therefore, a problem that sometimes occurs is that a data error increases after a period of time and the printed picture is distorted. That is, it has a problem that satisfactory communication cannot be realized in a region where the telephone circuit condition is not good.

SUMMARY OF THE INVENTION

The present invention offers a facsimile machine in which a printed picture is less distorted even if used in a region where the telephone circuit condition is not good.

A facsimile machine in accordance with an exemplary embodiment of the present invention includes modulation means for modulating data to be transmitted and for transmitting the modulated data to a telephone circuit;

demodulation means for demodulating data from a signal transmitted through the telephone circuit;

protocol control means for controlling protocol between the facsimile machine at the local site and a facsimile machine at a remote site;

phase/amplitude fluctuation detection means for detecting fluctuation values of phase and amplitude of the received signal transmitted through the telephone circuit;

communication speed determination means for determining if the communication speed should be changed or not, based on the fluctuation values detected at the phase/amplitude fluctuation detection means; and control means for transmitting a signal to change the communication speed to the facsimile machine at the remote site through the protocol control means, if the communication speed determination means determines to change the communication speed.

The phase/amplitude fluctuation detector quantitatively detects the fluctuation of the phase and the amplitude of the training TCF signal transmitted through the telephone circuit. When the fluctuation values of the phase and the amplitude of the training TCF signal detected at the phase/amplitude fluctuation detector is judged to exceed the designated allowance, the reception speed determination apparatus determines that the communication at the speed is impossible and makes the facsimile machine at the call-out site (remote site) decrease its communication speed through the protocol controller and determines at which speed to receive the data.

DETAILED DESCRIPTION OF THE INVENTION

Figure 1:
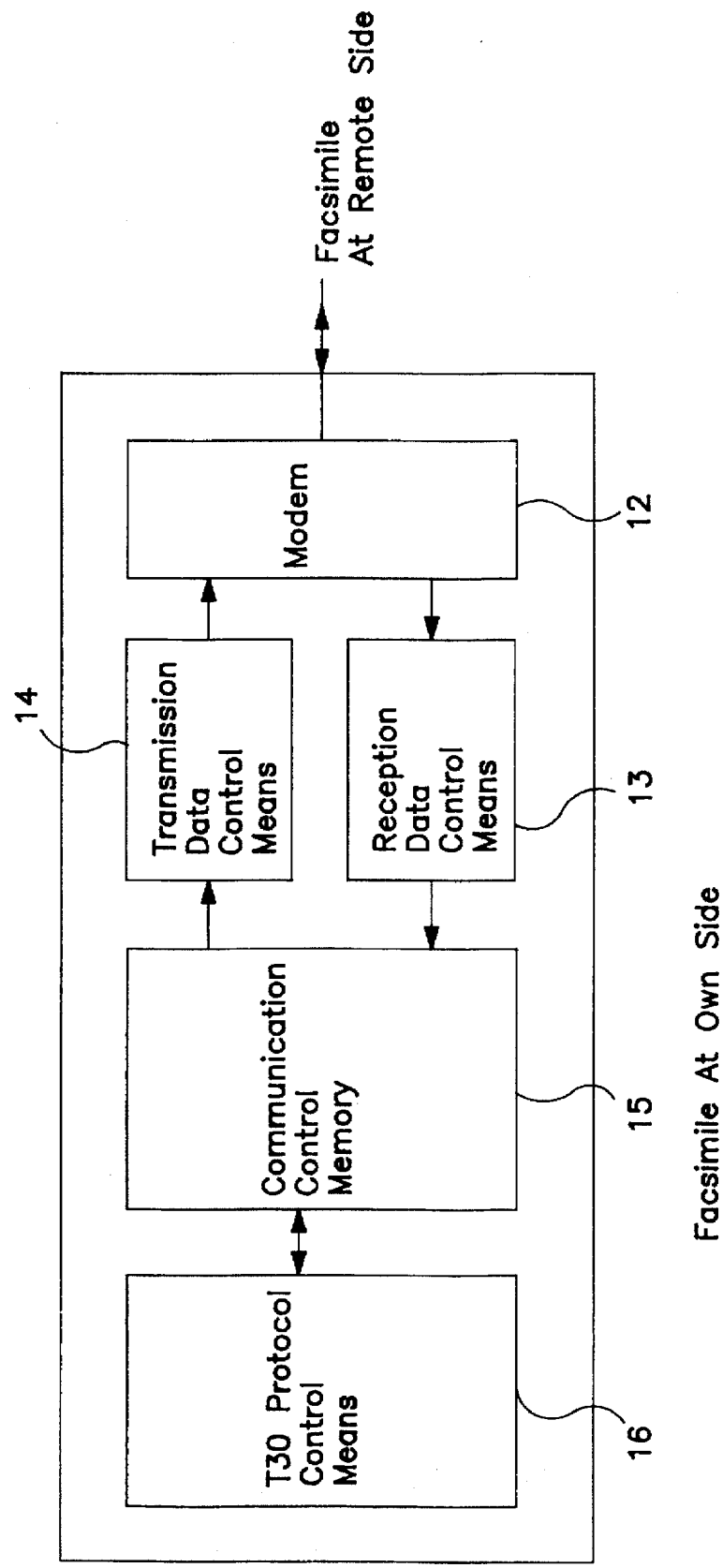
FIG. 1 is a block diagram of a facsimile machine in accordance with the prior art.
Figure 2:
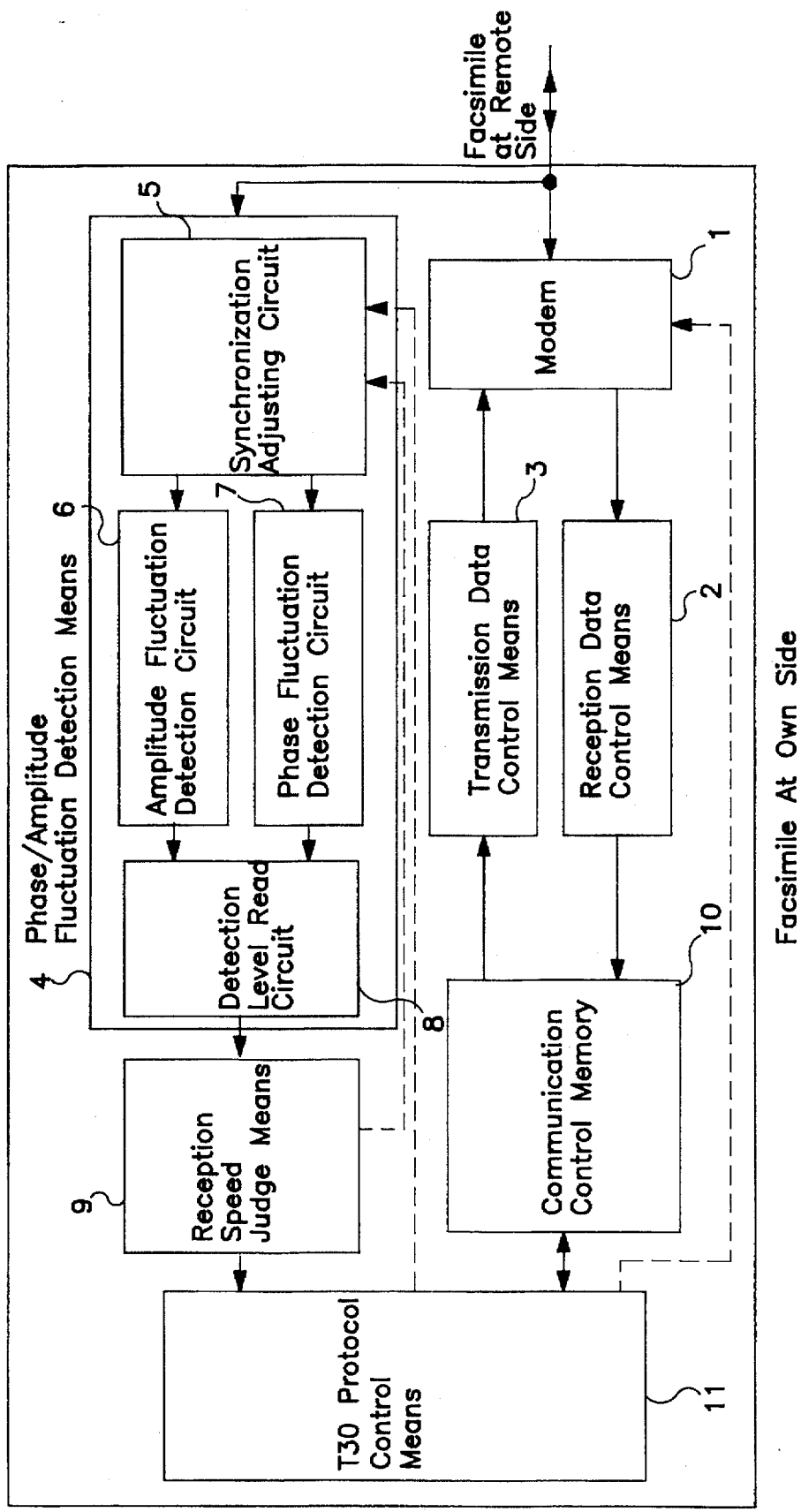
FIG. 2 is a block diagram of a facsimile machine in accordance with an exemplary embodiment of the present invention.

A block diagram of a facsimile machine in accordance with an exemplary embodiment of the present invention is shown in FIG. 2. When a facsimile machine receives an incoming call, an NSF/DIS signal is produced at a T30 protocol controller 11 and the signal is written in a communication control memory 10. The data written in communication control memory 10 is read at a transmission data controller 3 and then is written in a modem 1. An NSF/DIS signal is then transmitted to a facsimile machine at a remote site (call-out site).

A DCS signal transmitted from the facsimile machine at the remote site comes to modem 1 and data demodulated at modem 1 is read at a reception data controller 2. This date is then written in communication control memory 10 and the DCS signal from communication control memory 10 is analyzed at T30 protocol controller 11. A communication speed data value is included in the DCS signal.

T30 protocol controller 11 reads a communication speed data value included in the DCS signal and determines the reception speed against modem 1 to receive a training TCF signal transmitted from the facsimile machine at the call-out site. At the same time, the reception speed is determined so that the facsimile machine at the call-out site can detect the fluctuation of the phase and the amplitude. This is performed according to the communication speed designated with a DCS signal which is acted on by a synchronization adjusting circuit 5 in the phase/amplitude fluctuation detector 4.

The training TCF signal transmitted from the facsimile machine at the call-out site is demodulated at modem 1 and is then written in communication control memory 10 through reception data controller 2. The bit-pattern of the TCF data is analyzed at T30 protocol controller 11.

The training TCF signal is supplied both to phase/amplitude fluctuation detector 4 and to modem 1. At synchronization adjusting circuit 5, a synchronous signal is generated corresponding to the designated speed and the received signal is synchronized with the synchronous signal. The synchronized received signal is distributed to a phase fluctuation detection circuit 7 and an amplitude fluctuation detection circuit 6.

Each detection circuit, phase fluctuation detection circuit 7 and amplitude fluctuation detection circuit 6, converts the received signal to digital signals, E and $\Phi$, respectively, and supplies those digital signals to a detection level read circuit 8.

Figure 3:
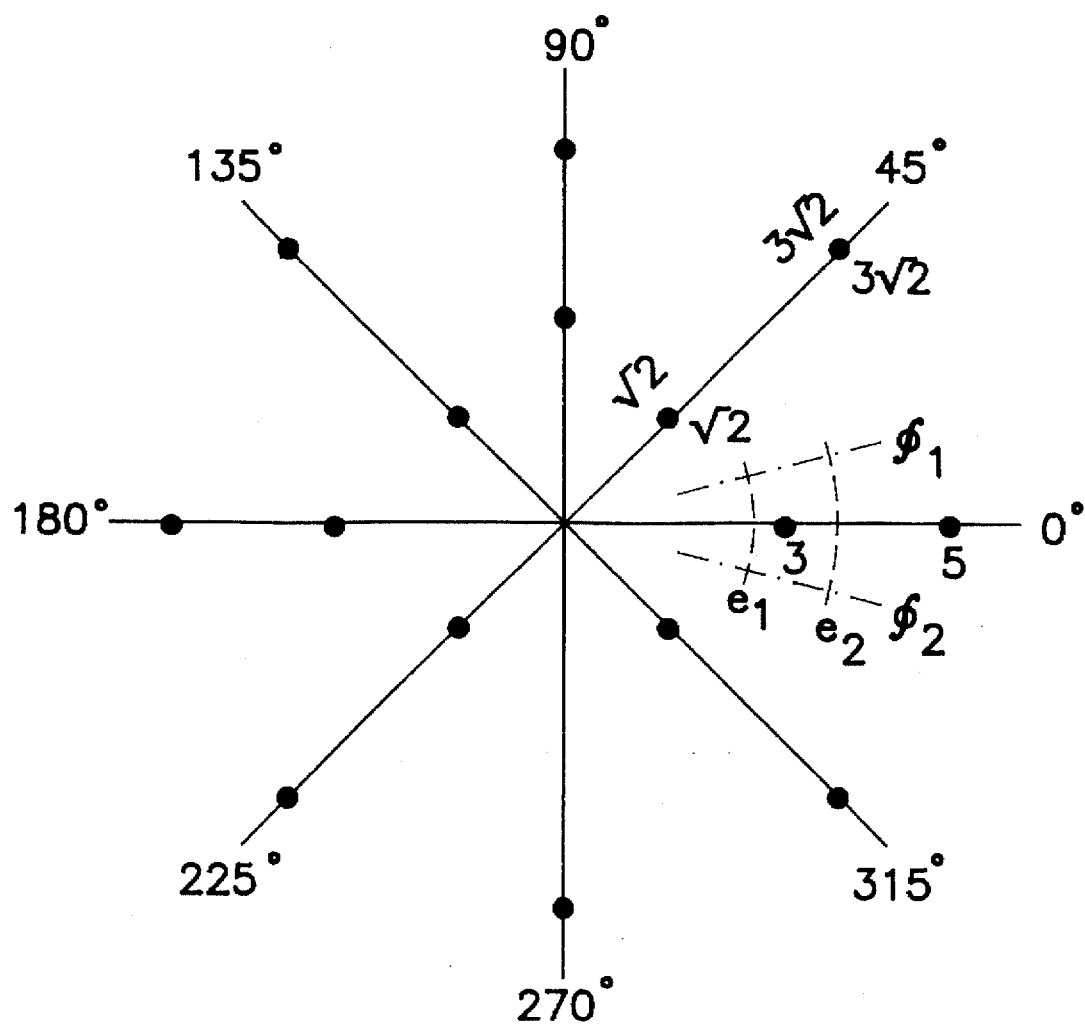
FIG. 3 is a signal space diagram of a facsimile machine in accordance with an exemplary embodiment of the present invention at V29 9,600 bps.

An example of a signal space diagram of a facsimile machine in accordance with an exemplary embodiment of the present invention at a V29 9,600 bps communication speed is shown in FIG. 3. The points in FIG. 3 indicate reference points of a modulated signal at 9,600 bps communication speed and the signal space diagram is ideally to be on these reference points. The amounts of phase and amplitude deviation from the reference points are detected at phase fluctuation detection circuit 7 and amplitude fluctuation detection circuit 6 and they are quantitatively read out at detection level read circuit 8.

At detection level read circuit 8, a value in the range from 0 to FF(HEX) is read. The larger the value is, the more difficult it is to determine which one of the two adjacent reference points shown in FIG. 3 is to be taken. It can be estimated that the received signal or the electric characteristic of the telephone circuit has some problem.

Chain lines § 1 and § 2 shown in FIG. 3 indicate fluctuation allowance of the phase. If the phase value read at detection level read circuit 8 is outside of the range between § 1 and § 2, communication speed determination apparatus 9 determines that the communication speed should be reduced.

Broken lines $e_1$ and $e_2$ shown in FIG. 3 indicate fluctuation allowance of the amplitude. If the amplitude value read at detection level read circuit 8 is outside of the range between $e_1$ and $e_2$, communication speed determination apparatus 9 determine that the communication speed should be reduced.

The above-mentioned determination is expressed in FIG. 4 as waveforms. The symbols E and $\Phi$ express phase and amplitude, respectively. The symbol $\Phi_0$ is a length of time of the synchronous signal generated at synchronization adjusting circuit 5. In this example, the signal phase $\Phi$ is measured at the zero cross point making $\Phi_0$ a reference phase. The symbols $\Delta\Phi$ and $\Delta E$ are allowable fluctuation values of amplitude and phase, respectively.

Figure 4A:
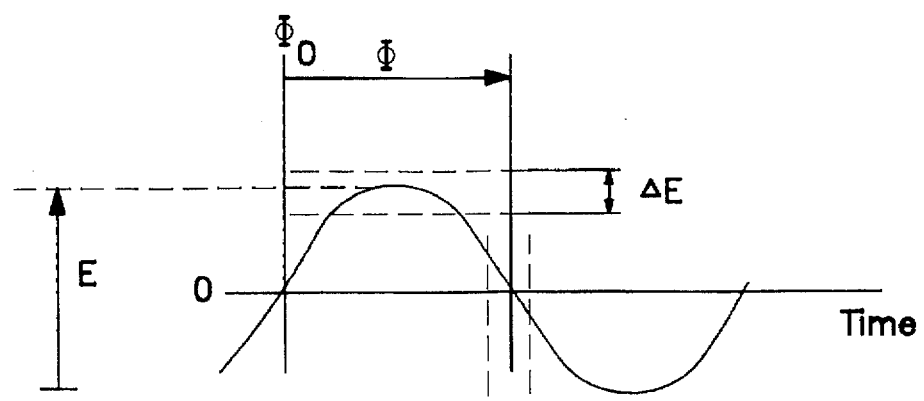
FIGS. 4a–c show time-based waveforms of an input signal determination at a facsimile machine in accordance with an exemplary embodiment of the present invention.
Figure 4B:
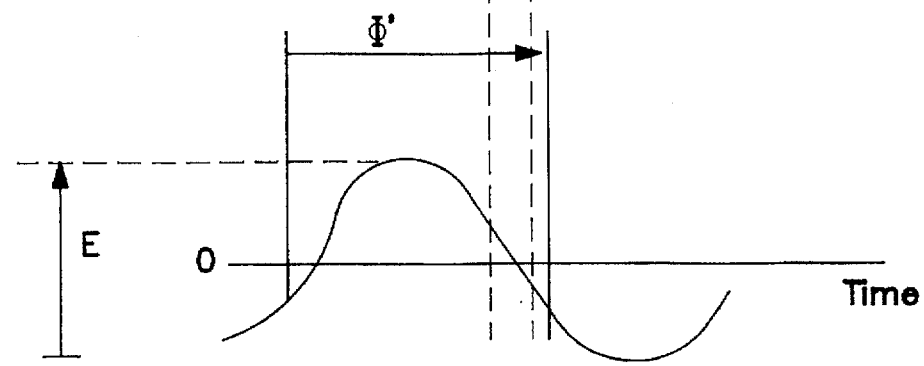
Figure 4C:
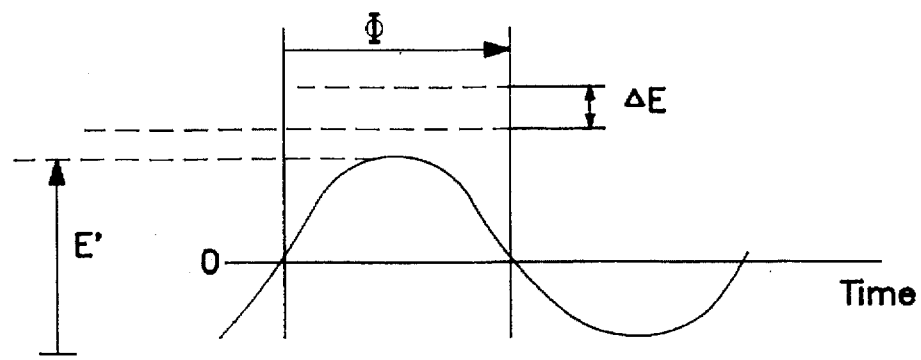

FIG. 4(a) shows a waveform of a normal input signal and the phase $\Phi$ of the signal is in the range of allowable fluctuation value $\Delta\Phi$ and the amplitude E of the signal also is in the range of allowable fluctuation value $\Delta E$. FIG. 4(b) shows a waveform of the input signal having a phase deviation and the signal phase $\Phi$, is out of the range of allowable fluctuation value $\Delta\Phi$. FIG. 4(c) shows a waveform of the input signal having a decreased amplitude and the signal amplitude E' is out of the range of allowable fluctuation value $\Delta E$.

Because the amplitude and the phase of the signal differ from one system configuration to another system configuration of a facsimile machine, the apparatus is designed so that the allowable fluctuation values, $\Delta\Phi$ and $\Delta E$, of the phase and the amplitude are appropriately adopted for each system configuration. Thus, the system is determined to be abnormal when the value of the system, which can be selected by a service mode (switch) in the facsimile machine, falls outside of the allowable range. In an exemplary embodiment of the present invention, default (the value initially set at shipment) of the allowable value is determined according to each reception speed as follows:

The maximum allowable fluctuation value at 9,600 bps communication speed=40(HEX), the maximum allowable fluctuation value at 7,200 bps communication speed=50 (HEX), the maximum allowable fluctuation value at 4,800 bps communication speed=70(HEX), and the maximum allowable fluctuation value at 2,400 bps communication speed=A0(HEX).

The signal is determined to be an abnormal signal when the values exceeding the maximum allowable fluctuation value appear for 1.5 seconds and exceed the received training signal by more than 20%. Because the appearance probability depends on the telephone circuit condition, it is designed such that the communication speed can be selected with the service mode switch.

Figure 5:
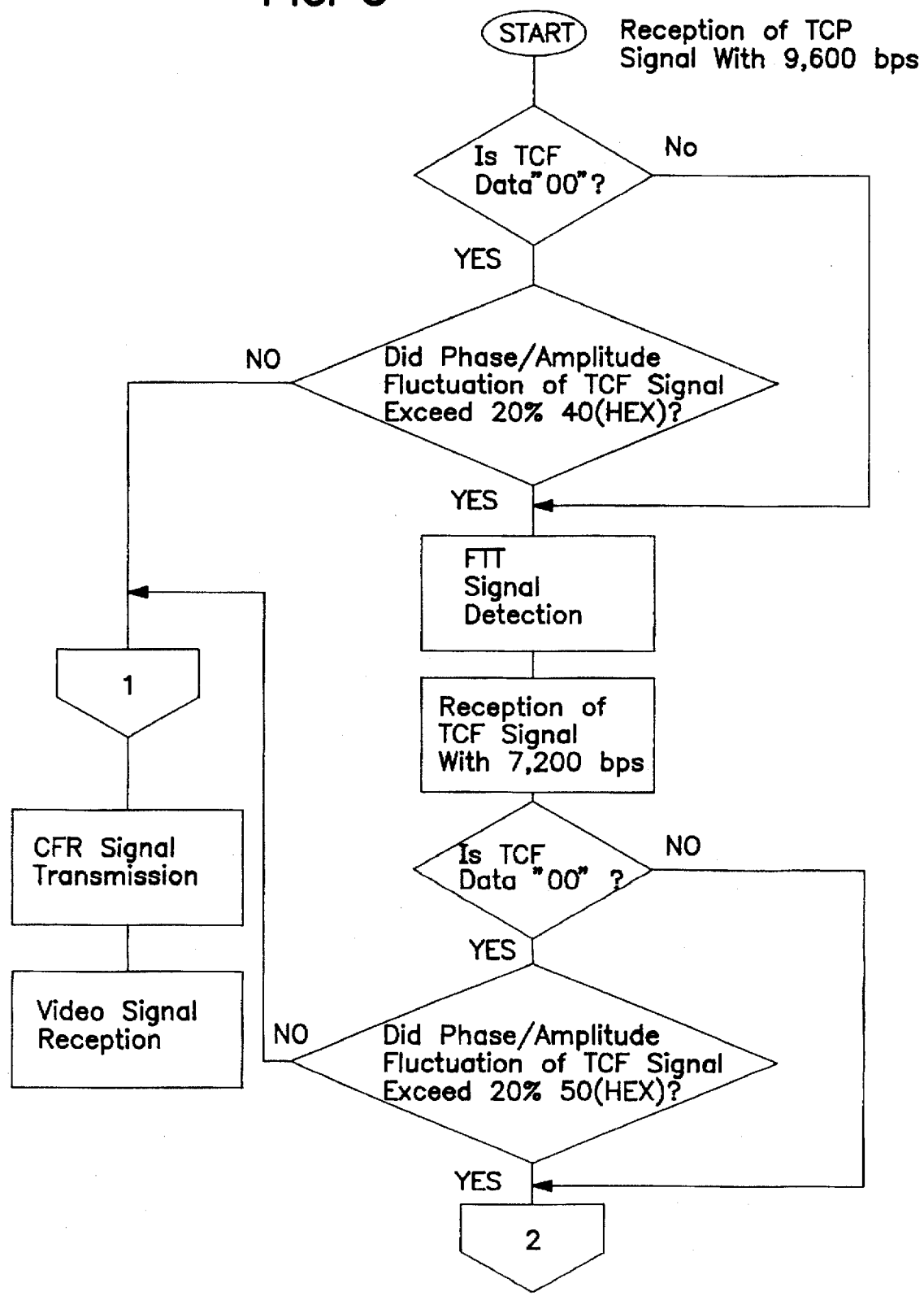
FIGS. 5–7 are flow chart diagrams for determining a reception speed of a facsimile machine in accordance with an exemplary embodiment of the present invention.
Figure 6:
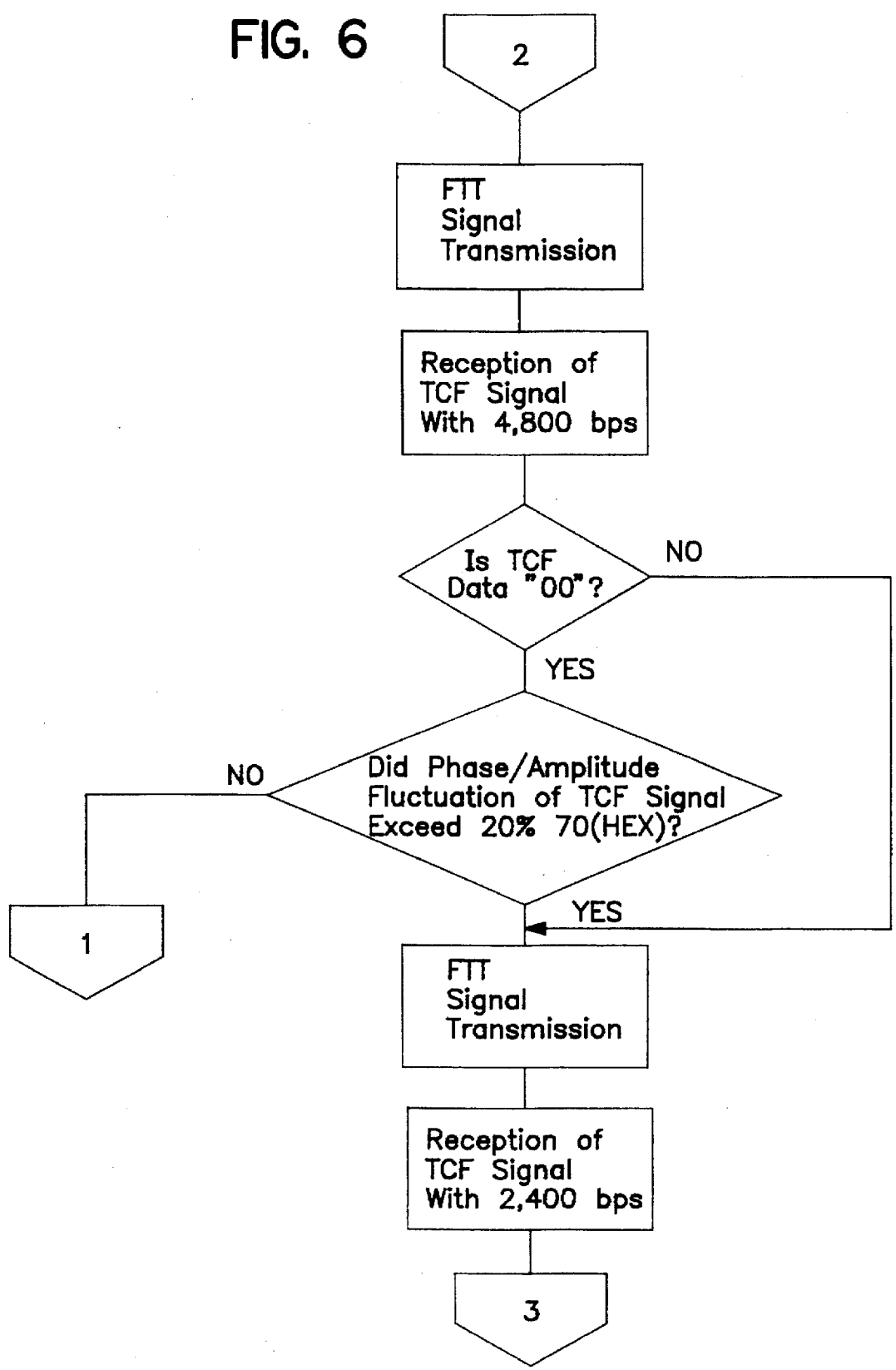
Figure 7:
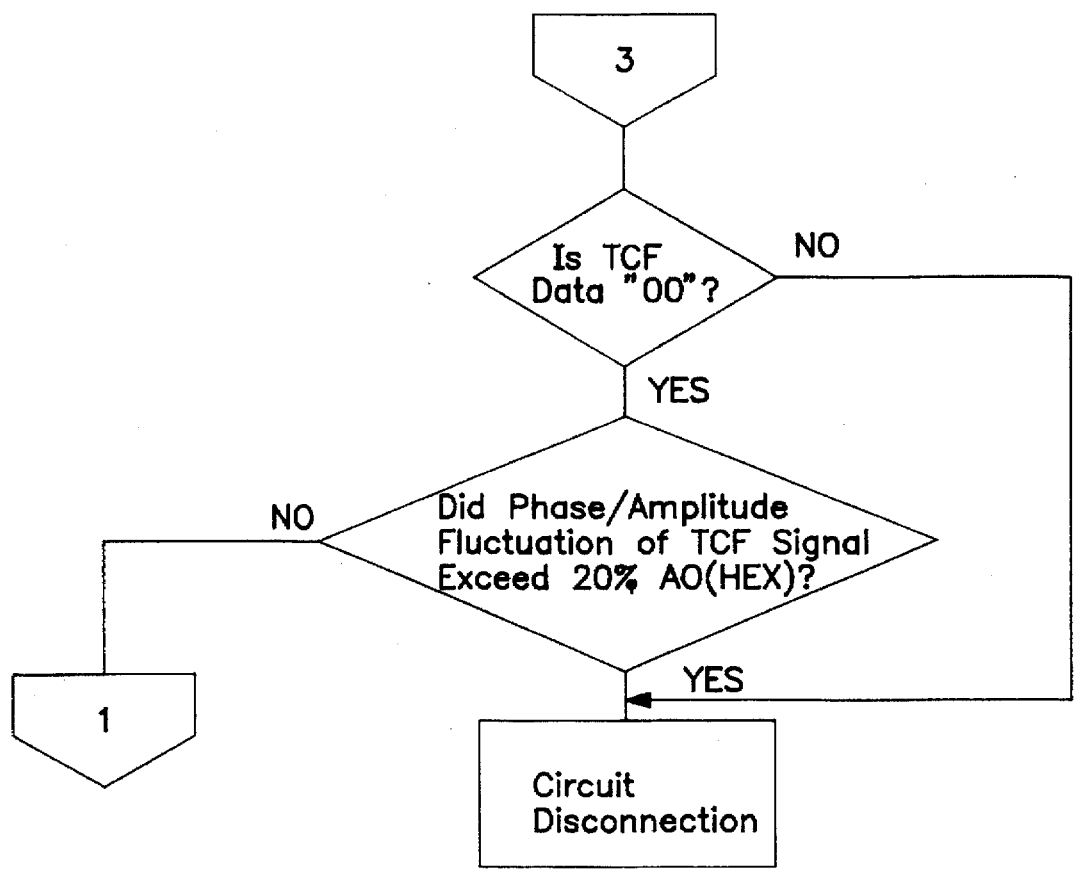

FIGS. 5-7 show a flow chart for determining a reception speed at phase/amplitude fluctuation detector 4, T30 protocol controller 11 and reception speed determination apparatus 9 of a facsimile machine in accordance with an exemplary embodiment of the present invention. When T30 protocol controller 11 analyzes the bit-pattern of the TCF data extracted from the training TCF signal and determines that there is no problem, T30 protocol controller 11 confirms whether or not the fluctuation values of the phase and the amplitude of the training TCF signal detected at phase/amplitude fluctuation detector 4 and compared by reception speed determination apparatus 9 exceeds the fluctuation value defined at the facsimile machine at the local site. When the fluctuation value exceeds the value defined at the facsimile machine at the local site, even if the bit-pattern of the TCF data has no problems (that is, when the training TCF signal of T30 protocol is received, all the TCF data transferred from modem 1 to communication control memory 10 is "0"), the reception of the training TCF signal is judged to be abnormal. That is, when the above-mentioned fluctuation value exceeds the value defined at the facsimile machine at the local site, the reception is judged to be abnormal and a FTT (Failure To Train) signal is produced and is written in communication control memory 10. Then transmission data controller 3 reads out the FTT signal from communication control memory 10 and writes in it modem 1. Thus, the FTT signal is transmitted to the facsimile machine at the call-out site (remote site).

The facsimile machine at the call-out site which received the FTT signal transmits a training TCF signal with a one step reduced communication speed. By repeating such a fall back procedure, the communication speed reduces step-by-step from, for example, 9,600 bps, to 7,200 bps, to 4,800 bps and finally to 2,400 bps. During this period, the bit-pattern of the TCF data and the phase and the amplitude of the training TCF signal are detected at T30 protocol controller 11 and phase/amplitude fluctuation detector 4 at the same time, respectively. Only when both detections have no problem, the facsimile machine at the call-out site transmits a CFR signal and the facsimile machine at the local site starts receiving video information.

A facsimile machine in accordance with an exemplary embodiment of the present invention functions to determine a communication speed using phase/amplitude fluctuation detector and reception speed determination apparatus upon reception of a training TCF signal. Accordingly, it is possible to receive video information accurately even in a region where the telephone circuit condition is not good.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed:

1. A facsimile machine with a) modulation means for modulating and transmitting a plurality of data values to a remote site facsimile machine and b) demodulation means for receiving and demodulating a signal received from said remote site facsimile machine at a communication speed, comprising:

phase/amplitude fluctuation detection means for detecting from said received signal a) a phase fluctuation value representing an amount of phase deviation from a predetermined phase reference point and b) an amplitude fluctuation value representing an amount of amplitude deviation from a predetermined amplitude reference point, of said received signal;

communication speed determination means for determining if the communication speed should be changed, based on each of said phase fluctuation value and said amplitude fluctuation value detected by said phase/amplitude fluctuation detection means; and protocol control means, for
a) starting communication of a video signal when a bit-pattern extracted from a training signal demodulated at said demodulation means is error free and said communication speed determination means determines that the communication speed should be maintained, and
b) signaling said remote site facsimile machine to reduce the communication speed if at least one of
1) the bit-pattern extracted from the training signal contains errors and
2) said communication speed determination means determines that the communication speed should be changed.

2. A facsimile machine as recited in claim 1, wherein:
said protocol control means signals said remote site facsimile machine to reduce said communication speed responsive to said communication speed determination means determining that said communication speed is to decrease based on whether said phase fluctuation value and said amplitude fluctuation value exceeding said predetermined threshold.

3. The facsimile machine of claim 1 for use with a communications link, wherein said phase amplitude detection means is located between said communications link and said demodulation means.

4. The facsimile machine of claim 1 wherein said communication speed determination means determines that the communication speed should be reduced when each of said phase fluctuation value and said amplitude fluctuation value which are detected by said phase/amplitude fluctuation detection means exceeds the respective predetermined threshold.

5. The facsimile machine of claim 1 wherein said protocol control means signals said remote site facsimile machine to reduce the communications speed if
a) the bit-pattern extracted from the training control signal contains errors and
b) said communication speed determination means determines that the communications speed should be changed.

6. A facsimile machine with a) modulation means for modulating and transmitting a plurality of data values to a remote site facsimile machine and b) demodulation means for receiving and demodulating a signal received from said remote site facsimile machine at a communication speed, comprising:

phase/amplitude fluctuation detection means for detecting from said received signal a) a phase fluctuation value representing an amount of phase deviation from a predetermined phase reference point and b) an amplitude fluctuation value representing an amount of amplitude deviation from a predetermined amplitude reference point, of said received signal; and protocol control means for
a) starting a communication of a video signal when a bit-pattern extracted from a training signal demodulated at said demodulation means is error free and said communication speed determining means determines that the communication speed should be maintained,
b) signaling said remote site facsimile machine to reduce the communication speed if at least one of the bit-pattern extracted from the training signal contains errors and said communication speed determination means determines that the communication speed should be changed, and
c) starting the communication of a video signal after said phase fluctuation value and said amplitude fluctuation value each become less than a respective predetermined threshold.

7. The facsimile machine of claim 6 for use with a communications link, wherein said phase amplitude detection means is located between said communications link and said demodulation means.

8. The facsimile machine of claim 6 further comprising communication speed determination means for determining if the communication speed should be changed, based on each of said phase fluctuation value and said amplitude fluctuation value detected by said phase/amplitude fluctuation detection means.

9. The facsimile machine of claim 8 wherein said communication speed determination means determines that the communication speed should be reduced when each of said phase fluctuation value and said amplitude fluctuation value which are detected by said phase/amplitude fluctuation detection means exceeds the respective predetermined threshold.

10. The facsimile machine of claim 6 wherein said protocol control means signals said remote site facsimile machine to reduce the communications speed if
 a) the bit-pattern extracted from the training control signal contains errors and
 b) said communication speed determination means determines that the communications speed should be changed.

* * * * *

UNITED STATES PATENT AND TRADE MARK OFFICE
CERTIFICATE OF CORRECTION

PATENT NO.  : 5,729,355
DATED       : March 17, 1998
INVENTOR(S) : Cho et al.

It is certified that error appears in the above-identified patent and that said Letters Patent is hereby corrected as shown below:

On the cover page, item [56] References Cited, U.S. Patent Documents, Patent No. 4,274,114, "Kozma" should read --Kozima--.

Signed and Sealed this

Twenty-third Day of March, 1999

*Attest:*

Q. TODD DICKINSON

*Attesting Officer*    Acting Commissioner of Patents and Trademarks